United States Patent
Wang et al.

(10) Patent No.: US 8,857,781 B2
(45) Date of Patent: Oct. 14, 2014

(54) MODULAR SKID BASE

(71) Applicant: Cummins Power Generation, Inc., Minneapolis, MN (US)

(72) Inventors: Edward J. Wang, Shoreview, MN (US); Brian D. Tjenstrom, Victoria, MN (US); Gregory P. Peterson, Maple Grove, MN (US); Steve N. Seidlitz, Sunfish Lake, MN (US); Gary Sandlass, Maple Plain, MN (US)

(73) Assignee: Cummins Power Generation, Inc., Minneapolis, MN (US)

( * ) Notice: Subject to any disclaimer, the term of this patent is extended or adjusted under 35 U.S.C. 154(b) by 0 days.

(21) Appl. No.: 13/666,288

(22) Filed: Nov. 1, 2012

(65) Prior Publication Data

US 2013/0106113 A1 May 2, 2013

Related U.S. Application Data

(60) Provisional application No. 61/554,432, filed on Nov. 1, 2011.

(51) Int. Cl.
*F16M 3/00* (2006.01)
*F16M 7/00* (2006.01)
*F16M 1/00* (2006.01)
*F16M 5/00* (2006.01)

(52) U.S. Cl.
CPC . *F16M 5/00* (2013.01); *F16M 7/00* (2013.01); *F16M 1/00* (2013.01)
USPC .......................................................... 248/678

(58) Field of Classification Search
CPC ...................................................... F16M 1/00
USPC ............................................ 290/1 A; 248/639
See application file for complete search history.

(56) References Cited

U.S. PATENT DOCUMENTS 4,501,973 A 2/1985 Fenemore et al.
4,835,405 A * 5/1989 Clancey et al. ............... 290/1 A (Continued)

FOREIGN PATENT DOCUMENTS

EP 0931918 7/1999
JP 08019485 A * 1/1996

(Continued)

OTHER PUBLICATIONS

"Diesel Generator Set: Standby 3000 ekW 3750 kVA 60 Hz 1800 rpm 12470 Volts", Caterpillar, May 2008, 6 pages.

(Continued)

*Primary Examiner* — Joseph Waks
(74) *Attorney, Agent, or Firm* — Foley & Lardner LLP (57) ABSTRACT

A modular skid base is provided for supporting, for example, a power generation system that includes a prime mover (e.g., an engine) and a driven machine (e.g., an alternator; a generator; a compressor; a pump; a gear drive for, for example, heavy industrial applications; or any other type of load device). The modular skid base includes a pair of first support skid rails and a pair of second support skid rails. The modular skid base also includes an overlapping section that includes a portion of the second support skid rails overlapping a portion of the first support skid rails along a length direction of the modular skid base. The overlapping section can provide stiffness where required without adding height and mass to the entire modular skid base.

17 Claims, 8 Drawing Sheets

(56) References Cited

U.S. PATENT DOCUMENTS

| | | | |
|---|---|---|---|
| 5,085,396 A * | 2/1992 | Mansson | 248/678 |
| 5,464,188 A | 11/1995 | Priebe et al. | |
| 5,816,102 A * | 10/1998 | Kern et al. | 74/412 R |
| 5,975,227 A * | 11/1999 | Vlad | 180/65.245 |
| 6,608,393 B2 * | 8/2003 | Anderson | 290/1 A |
| 6,869,367 B2 | 3/2005 | Herdin et al. | |
| 6,877,581 B2 | 4/2005 | Badr et al. | |
| 7,028,970 B1 * | 4/2006 | Wiseman | 248/669 |
| 7,082,896 B2 | 8/2006 | Allen et al. | |
| 7,175,166 B2 * | 2/2007 | Akamatsu et al. | 267/140.11 |
| 7,642,665 B2 | 1/2010 | Konop et al. | |
| 7,795,745 B2 | 9/2010 | Mellon et al. | |
| 7,969,030 B2 | 6/2011 | Woods et al. | |
| 7,976,266 B2 | 7/2011 | Brown et al. | |
| 2001/0029908 A1 * | 10/2001 | Suzuki | 123/41.31 |
| 2013/0227834 A1 * | 9/2013 | Nordstrom et al. | 29/592.1 |

FOREIGN PATENT DOCUMENTS

| | | |
|---|---|---|
| JP | 2569106 | 1/1997 |
| WO | 98/50727 | 11/1998 |
| WO | 2009/147287 | 12/2009 |

OTHER PUBLICATIONS

"Diesel Engine-Generator Set 3250-XC6DT2: 3250 kWe/60 Hz/Standby 480-13.8kV", MTU Onsite Energy, Jun. 2011, 4 pages.

* cited by examiner

MODULAR SKID BASE

PRIORITY

This application claims the benefit of U.S. Provisional Application No. 61/554,432, entitled "MODULAR SKID BASE", filed Nov. 1, 2011 which is incorporated herein by reference in its entirety.

TECHNICAL FIELD

This disclosure relates to skid bases. In particular, this disclosure is directed to modular skid bases that can support, for example, prime mover and driven machine systems.

BACKGROUND

Skid base can be used for supporting components such as, for example, power generation systems that have a prime mover (e.g., an engine) and a driven machine (e.g., an alternator; a generator; a compressor; a pump; a gear drive for, for example, heavy industrial applications; or any other type of load device). These skid bases can be used for supporting and in some instances permanently mounting the components and can stay with the components when exposed to conditions such as, for example, shipping, transit and use, etc. Skid bases for power generation systems are typically designed to include a single set of side rails for mounting both a prime mover and a driven machine. For larger power generation systems, the skid bases, and therefore the side rails, can be greater than 6 meters in length. When a prime mover and a driven machine are mounted to the skid base, transportation and use of the power generation system can create high stress levels on the skid base and create flexure between the prime mover and the driven machine. Furthermore, to accommodate prime movers and driven machines with different widths, conventional skid bases usually include different support members with different widths and heights, which can result in a machined surface requirement in order to meet the required tolerance. Materials cost and excessive machining hours could be extremely expensive given the size of a skid which is over 6 meters in length. The result of the stress levels, flexure and reduced stiffness in the skid base, particularly in the area between the prime mover and the driven machine, can result in stress levels during use or transportation of the power generation system which can lead to the skid base cracking and causing component failures on the power generation system.

SUMMARY

This disclosure is directed to skid bases. In particular, embodiments are provided herein for a modular skid base for supporting a power generation system. The power generation system can include, for example, a prime mover and a driven machine.

Embodiments of a modular skid base are provided that can support, for example, (a) a prime mover that provides input power to rotate a shaft of or otherwise operate a driven machine and (b) a driven machine. In some embodiments, the modular skid base can support a prime mover, such as an internal combustion engine (e.g., diesel engine, gas engine, etc.). In other embodiments, the modular skid base can support a prime mover that uses various other types of energy sources, such as steam turbine, electric motor, etc. Also, in some embodiments, the modular skid base can support many different types of driven machines including, for example, an alternator (e.g., a linear alternator); a generator; a compressor; a pump; a gear drive for, for example, use in heavy industrial applications; or any other type of load device.

The modular skid base is configured to provide additional stiffness and support with lower overall skid/beam height in an area between the prime mover and the driven machine to limit torsional and bending forces in that region and on the prime mover and driven machine themselves caused by forced and resonant responses during operation, while removing mass from the ends of the modular skid base. The embodiments herein also provide a modular skid base that can reduce the effect of forced and resonant responses during shipping and handling. The embodiments herein further provide a modular skid base that can prevent pre-mature fatigue failure of a power generation system (e.g., a prime mover, a driven machine and their components) that can develop due to long term effects of a dynamic load (e.g., when fatigue stresses and duration of the power generation system exceed the fatigue strength of materials). The embodiments herein also provide a modular skid base that can reduce the effect of or prevent bending forces from passing to an engine block of the prime mover, to couplings between the prime mover and the driven machine, and/or to the driven machine during shipping, handling, and operation. Additionally, the embodiments herein also provide a modular skid base that can provide a natural resonance well outside the predicted resonance of the power generation system during operation.

In particular, the modular skid base includes an overlapping section that can increase stiffness to the side rails of the modular skid base in an area between the prime mover and the driven machine, without adding to the overall height or mass of the modular skid base that can occur when attempting to increase stiffness to the side rails by using taller beams or tubes as the side rails. This area can be an area of the modular skid base that requires the most strength and stiffness as torsional and bending forces caused by torque reaction and flexing typically occur most frequently in the area between the prime mover and the driven machine. The increased stiffness can allow for more access holes along support skid rails and cross members of the modular skid base without sacrificing the structural strength of the modular skid base. The overlapping section can be positioned underneath an area where the driven machine is connected to the prime mover (either for open coupled machines or close coupled machines). For example, in a closed couple machine, the overlapping section can be positioned underneath an area where a flywheel housing of the prime mover and an adapter of the driven machine are directly connected by, for example, bolts).

Also, the modular skid base, as described herein, is configured to have a low profile such that when a prime mover and/or driven machine is mounted onto the modular skid base, the combination of the modular skid base, the prime mover and/or the driven machine can fit into a container, such as an intermodal container (e.g., a standard ISO container). That is, the modular skid base can use lower sized sections (e.g., an overlapping section, a driven machine section at one end of the overlapping section, and a prime mover section at an opposing end of the overlapping section) to reduce the overall height of the modular skid base and thereby the overall height of the prime mover and/or driven machine with the modular skid base.

In addition, by using an overlapping section, the modular skid base can be designed to use more affordable standard length steel beams, such as I-Beams or Rectangular Steel Tubes (RST) (e.g., a standard tube, which are typically up to ~20 ft long) as opposed to using custom sized beam tubes sections longer than 20 feet which could result in additional waste (e.g., excess material that may have to be recycled or otherwise disposed of) and cost. Also, for example, 16 inch by 8 inch tubes can be used in place of 16 inch by 16 inch tubes, thereby reducing the cost and weight of the modular skid base.

Furthermore, the modular skid base, as described herein, can have less mass and lower weight than a conventional support frame supporting a similar sized prime mover and/or driven machine.

Moreover, the embodiments of the modular skid base can be configured to provide a wide section at one end of the overlapping section and a narrow section at the opposing end of the overlapping section. Accordingly, the modular skid base can accommodate, for example, a large driven machine with a wide footprint on the wide section of the modular skid base and a prime mover that has a narrower width that the driven machine on the narrow section of the modular skid base. The overlapping section can also allow the modular skid base to have a variable width skid base to suit driven machines having mounting brackets with different widths.

Additionally, in these embodiments, the modular skid base can be designed to prevent a resonant response that can damage the modular skid base and/or the power generation system by configuring the modular skid base with the power generation system such that the resonant frequency of the modular skid base with the power generation system does is outside the range of excitation frequencies of the power generation system during operation. By efficiently increasing or decreasing the stiffness of the modular skid base, particularly by increasing or decreasing the length of the overlapping section, the vibration levels of the power generation system can be lowered. Thus, the natural resonance frequency of the modular skid base with the power generation system can be increased or decreased by adjusting the length of the overlapping section as desired for the particular application.

Also, by using an overlapping section, the modular skid base can be constructed more easily with smaller modular sections and by allowing welding of the overlapping section.

In one embodiment, a modular skid base for supporting a prime mover and a driven machine is provided. The modular skid base includes a pair of first support skid rails, a pair of second support skid rails and an overlapping section. Each of the first support skid rails has an inner surface along a length of the respective first support skid rails and an outer surface along the length of the respective first support skid rails. The pair of second support skid rails is connected to the first support skid rails. Also, each of the second support skid rails has an inner surface along a length of the respective second support skid rails and an outer surface along the length of the respective second support skid rails. The overlapping section includes a portion of the inner surface of each of the second support skid rails overlapping a portion of the outer surface of each of the first support skid rails. The overlapping section extends along a length direction of the first and second support skid rails.

In another embodiment, a power generation system and skid base combination is provided. The power generation system includes a prime mover, a generator and a skid base for supporting the prime mover and the generator. The skid base includes a pair of first support members and a pair of second support members coupled to the first support members. Each of the first support members has an inner surface along a length of the respective first support member and an outer surface along the length of the respective first support member. Each of the second support members has an inner surface along a length of the respective second support member and an outer surface along the length of the respective second support member. Also, a portion of the inner surface of each of the second support members overlaps a portion of the outer surface of each of the first support members to form an overlapping section. The overlapping section extends along a length direction of the of the first and second support members.

In yet another embodiment, a method for manufacturing a modular skid base is provided. The method includes providing a pair of first skid rails and a pair of second skid rails. Also, the method includes overlapping the pair of second rails with the pair of first rails such that a portion of an inner surface of each of the second skid rails contacts a portion of an outer surface of each of the first skid rails. Furthermore, the method includes connecting the portion of the inner surface of each of the second skid rails to the portion of the outer surface of each of the first skid rails.

DETAILED DESCRIPTION

The embodiments provided herein are directed to a power generation system, and particularly a modular skid base of a power generation system.

Specific details are given in the following description to provide a thorough understanding of the embodiments. However, it will be understood by a person of ordinary skill in the art that the embodiments may be practiced without these specific details.

The embodiments provided herein are directed to a power generation system, and particularly a modular skid base of a power generation system. The modular skid base is configured to provide additional stiffness and support in an area between the prime mover and the driven machine to limit torsional and bending forces on the sides of the modular skid base caused by torque reaction and sub-space flexing, while removing mass from the ends of the modular skid base, and thereby increasing resonant frequencies. The embodiments herein also provide a modular skid base that can withstand excessive bending forces from passing to the engine block of the prime mover, from passing to couplings between the prime mover and the driven machine, and/or from passing to the driven machine during shipping, handling, and operation. The embodiments herein also provide a modular skid base that can prevent harmful resonant responses by having a natural frequency that when combined with the resonant frequencies of the prime mover and the driven machine during operation, is outside of the operating speed range of the power generation system. The embodiments herein further provide a modular skid base that can reduce or prevent pre-mature fatigue failure of the power generation system. The embodiments herein further provide a lower profile modular skid base that can more easily support a product (e.g., a power generation system) and fit inside an intermodal container (e.g. a standard ISO dry cargo container). Furthermore, the embodiments provide a modular skid base that can be manufactured at a lower cost than conventional support frames by, for example, using commonly available lengths of side beams.

FIGS. 1A-1E provide multiple views of a power generation system 100, according to one embodiment. The power generation system 100 includes a prime mover 110 connected to a driven machine 120. The prime mover 110 and the driven machine 120 are mounted onto a modular skid base 130. In this embodiment, the prime mover 110 is a 95 liter prime mover. In other embodiments, the prime mover 110 can be other types of engines or prime movers that are connected to a driven machine. Also, the driven machine 120 in this embodiment has a wider footprint than the prime mover 110. However, in other embodiments, the driven machine 120 can have the same width as the prime mover 110 or a narrower width than the prime mover 110.

As described in more detail below, the modular skid base 130 includes an overlapping section 135 located below a portion where the prime mover 110 is connected to the driven machine 120. In particular, the overlapping section 135 is located below where a joint of an engine flywheel (not shown) of the prime mover 110 is connected to a driven machine adapter (not shown) of the driven machine 120. It has been found that during transportation and/or use of the power generation system, for example, with respect to high horsepower generator systems, the area where the prime mover connects to the driven machine undergoes significantly higher levels of vibration, torque and stress loading than the rest of the power generation system. The overlapping section 135 can provide additional stiffness and support in this area of interface, which can thereby, among other advantages, increase resonant frequencies of the power generation system, lower stress levels of the power generation system, and increase the fatigue life of the power generation system.

In contrast, conventional support frames for high horsepower generator systems require non-standard structural steel (e.g., steel beams longer than ~30 ft or longer in length) to construct a support frame that can be ~20 ft or longer in length to accommodate the prime mover and the driven machine. These non-standard raw materials often require longer lead time to obtain and can be difficult to acquire. Also, these non-standard raw materials can result in additional costs due to, for example, higher shipping and handling fees. Furthermore, conventional support frames may provide less stiffness to support, for example, a high horsepower generator system and may not obtain the frequency resonance properties (when supporting a high horsepower generator system during operation) obtained by the modular skid base 130 (when supporting a high horsepower generator system during operation). Also, for the conventional support frame to provide the necessary stiffness to support a high horsepower generator system, the height of the beams are increased, thereby raising the profile of the supporting frame and making it more difficult to fit the high horsepower generator system with the supporting frame into an intermodal container (e.g., a standard ISO dry cargo container). Moreover, the conventional support frame cannot provide variable widths and therefore is unable to easily fit different sized mounting brackets of driving machines.

FIGS. 2A-2E provide multiple views of a modular skid base 200 for mounting a prime mover and a driven machine, according to one embodiment. The modular skid base 200 provides modularity for supporting a prime mover and a driven machine of various sizes.

The modular skid base 200 can have a lower profile utilizing standard beam sizes and heights than prior art skid bases of equivalent stiffness such that when a prime mover and a driven machine are mounted to the modular skid base, the power generation system (e.g., the prime mover, the driven machine and the modular skid base) can fit, for example, within a freight container (e.g., an International Standards Organization (ISO) high cube 40 foot container in accordance with ISO 668-1995 standard for container dimensions).

Also, the configuration of the modular skid base 200 can have less overall weight than conventional skid bases. Furthermore, the modular skid base 200 can provide increased stiffness in an area between the prime mover and the driven machine. The increased stiffness can lead to smaller resonant responses of the power generation system (i.e., the power generation system has higher resonant frequencies, lowering the chances of having large resonant responses and resulting adverse effects to the modular skid base such as metal fatigue and cracking due to skid flexing induced stress and due to bearing wear of the prime mover and the driven machine).

Moreover, the modular skid base 200 can be constructed with common commodity available standard beam length materials as compared to one that would require longer length beams or custom sizes used by conventional skid bases with single parallel skid rails and result in less skid base mass. Moreover, the modular skid base 200 can have a lower height for an equivalent stiffness and a narrower width at one end and a wider width at the opposing end. This allows a prime mover and a driven machine having different widths to still be mountable on the modular skid base 200.

The modular skid base 200 includes a pair of first support skid rails 210 and a pair of second support skid rails 220. The modular skid base 200 also includes an overlapping section 230 that includes a certain portion of an inner surface 224 of each of the second support skid rails 220 overlapping an outer surface 212 of each of the first support skid rails 210 along a length direction L of the modular skid base.

The length and position of the overlapping section 230 can vary depending on the requirements of the modular skid base. For example, in some embodiments, the overlapping section 230 can extend a certain distance from an end of the first support skid rails 210 and/or extend a certain distance from an end of the second support skid rails 220. For example, in one embodiment, the length that the inner surface 224 of each of the second support skid rails 220 overlaps the outer surface 212 of each of the first support skid rails 210 can be, for example, ⅓ the length of the first support skid rails 210. In another embodiment, the length that the inner surface 224 of each of the second support skid rails 220 overlaps the outer surface 212 of each of the first support skid rails 210 can be, for example, ⅓ the length of the second support skid rails 220. Also, in some embodiments, the length that the inner surface 224 of each of the second support skid rails 220 overlaps the outer surface 212 of each of the first support skid rails 210 can be at least 4 times the height H of the modular skid base. In other embodiments, the length that the inner surface 224 of each of the second support skid rails 220 overlaps the outer surface 212 of each of the first support skid rails 210 can be at least 4 times the height of one of the first support skid rails 210 and/or at least 4 times the height of one of the second support skid rails 220.

In yet some other embodiments, the first support skid rails 210 can extend along the entire length of the second support skid rails 220 such that the overlapping section 230 also extends across the entire length of the second support skid rails 220. Furthermore, in some embodiments the overlapping section 230 is configured to extend underneath a driven machine by at least ⅓ the length of the driven machine and is configured to extend underneath the generator by at least ⅓ the length of the generator, as shown with respect to the modular skid base 130 in FIGS. 1A-1E.

By overlapping the first support skid rails 210 with the second support skid rails 220, the modular skid base 200 can increase a cross-section thickness where a prime mover is connected to a driven machine, thereby providing additional stiffness and less flex at the overlapping section 230. The increased stiffness at the overlapping section 230 can lower the resonance frequency response of the entire power generation system (i.e. the power generation system can have a higher natural resonance frequency that is outside of the operating speed range of the power generation system). Furthermore, with the overlapping section 230, the modular skid base 200 can accommodate driven machines having a width footprint that is wider or narrower than the width of a prime mover. It is also noted that the additional stiffness and/or resonance response of the skid base can be selected by the amount of overlap.

In some embodiments, the pair of first support skid rails 210 is welded to the pair of second support skid rails 220 at the overlapping section 230. In other embodiments, the pair of first support skid rails 210 can be bolted (e.g., with fasteners), or attached using other attachment methods (e.g., using rivets), to the pair of second support skid rails 220 at the overlapping section 230. Also, in some embodiments, an intervening member may be placed between where the pair of first support skid rails 210 is attached to the pair of second support skid rails 220 at the overlapping section 230 in order to, for example, increase the width of the overlapping section 230.

The modular skid base 200 also includes a first cross member 250 that connects the pair of first support skid rails 210 at a first end 202 of the modular skid base 200. In some embodiments, the first cross member 250 is welded or otherwise coupled to an inner surface 214 of each of the first support skid rails 210. While the first cross member 250 is disposed at the first end 202, in some embodiments, the first cross member 250 is positioned along the length L of the modular skid base near the first end 202. The first cross member 250 provides further support for the modular skid base 200.

The modular skid base 200 further includes a second cross member 265 that connects the pair of second support skid rails 220 near a second end 204 of the modular skid base 200. In some embodiments, the second cross member 265 is welded or otherwise coupled to an inner surface 224 of each of the second support skid rails 220. While the second cross member 265 is disposed at the second end 204, in some embodiments, the second cross member 265 can be disposed along the length L of the modular skid base near the second end 204. The second cross member 265 provides further support for the modular skid base 200 and can prevent bowing. A cutout portion 267 is provided at a top surface of the cross member 260 that can accommodate, for example, a driven machine.

The modular skid base 200 also includes a third cross member 255 that connects the pair of first support skid rails 210 within the overlapping section 230 of the modular skid base 200. In some embodiments, the third cross member 255 is welded or otherwise coupled to the inner surface 214 of each of the first support skid rails 210. The third cross member 255 provides further support for the modular skid base 200. In some embodiments, the third cross member 255 is positioned to be close to a prime mover, but still allow a user access to an oil pan of the prime mover. In some embodiments, a modular skid base can be constructed without a third cross member, such as the third cross member 255. In some embodiments, a generator is mounted onto the first cross member 250 and the third cross member 255.

The modular skid base 200 further includes a fourth cross member 260 that connects the pair of second support skid rails 220 and/or connects the pair of first support skid rails 210 near the overlapping section 230 of the modular skid base 200. In some embodiments, the fourth cross member 260 is welded or otherwise coupled to the inner surface 224 of each of the second support skid rails 210. In some embodiments, the fourth cross member 260 can also be welded to an end surface of each of the first support skid rails 210. The fourth cross member 260 provides further support for the modular skid base 200. In some embodiments, the fourth cross member 260 is positioned to be close to a driven machine, but still allow a user access to a bottom of the driven machine. In some embodiments, a modular skid base can be constructed without a third cross member, such as the fourth cross member 260. A cutout portion 262 is provided at a top surface of the fourth cross member 260 that can accommodate, for example, a driven machine. In some embodiments, a driven machine is mounted onto the fourth cross member 260 and the second cross member 265.

It is noted that the overlapped design of the skid base allows for shorter cross members, further increasing stiffness with fewer cross members. In addition, diagonal cross braces can be added to increase the transverse stiffness of the resulting skid base. It is also noted that these cross members can be placed at the overlap portion of the skid base where they will be most beneficial, while the remaining portion of the skid base remains open for ease of access to the prime mover and the driven machine by changing the cross-section of the skid base gradually.

Furthermore, the overlapped design of the skid base also reduces the number of cross braces necessary for supporting, for example, a power generation system. Accordingly, the skid base can be manufactured at a lower cost, with less manufacturing, less welding, less material and with additional access to areas beneath the high horsepower generator system and still provide at least the same and if not more stiffness and resistance to heat flex and warpage than a conventional supporting frame used to support an equivalent high horsepower generator system.

Figure 1A:
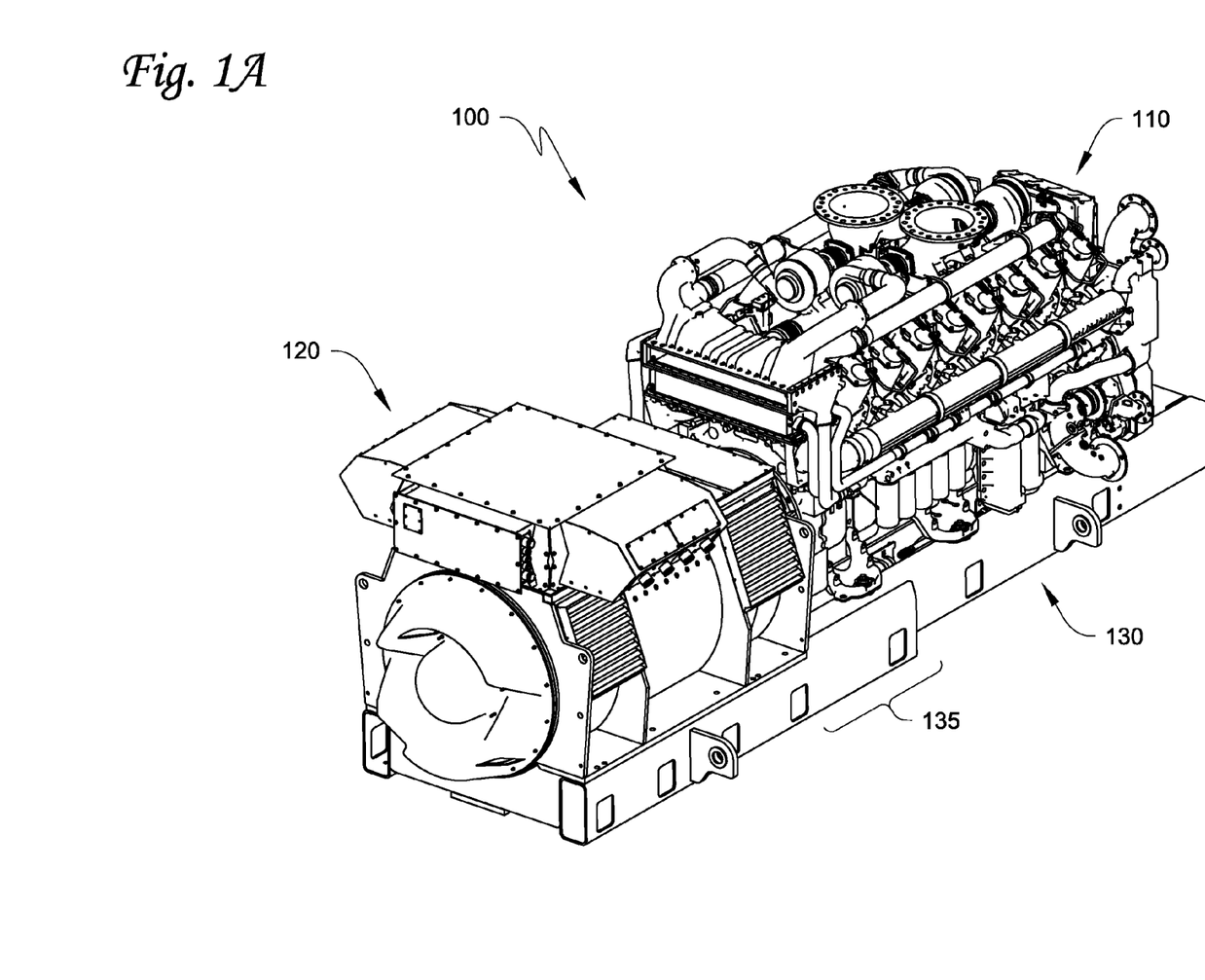
FIG. 1A is a perspective view of a power generation system, according to one embodiment.
Figure 1B:
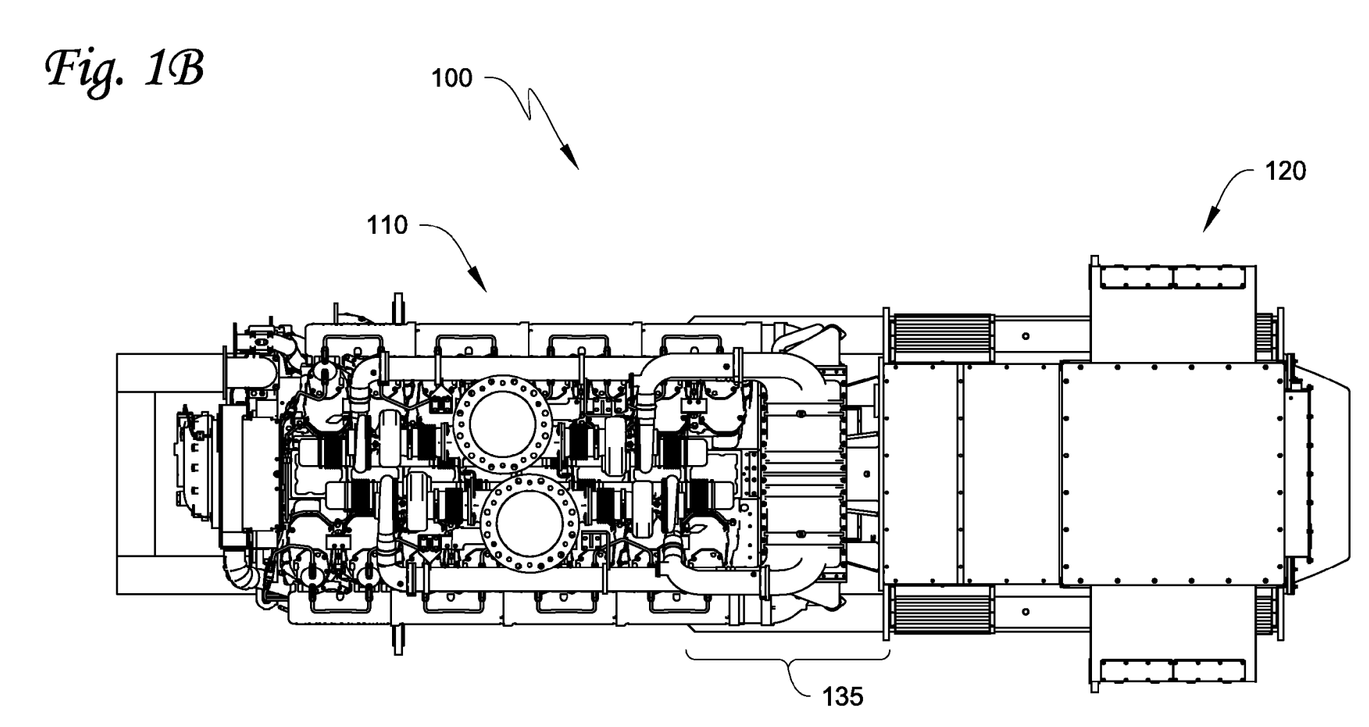
FIG. 1B is a top view of the power generation system, according to one embodiment.
Figure 1C:
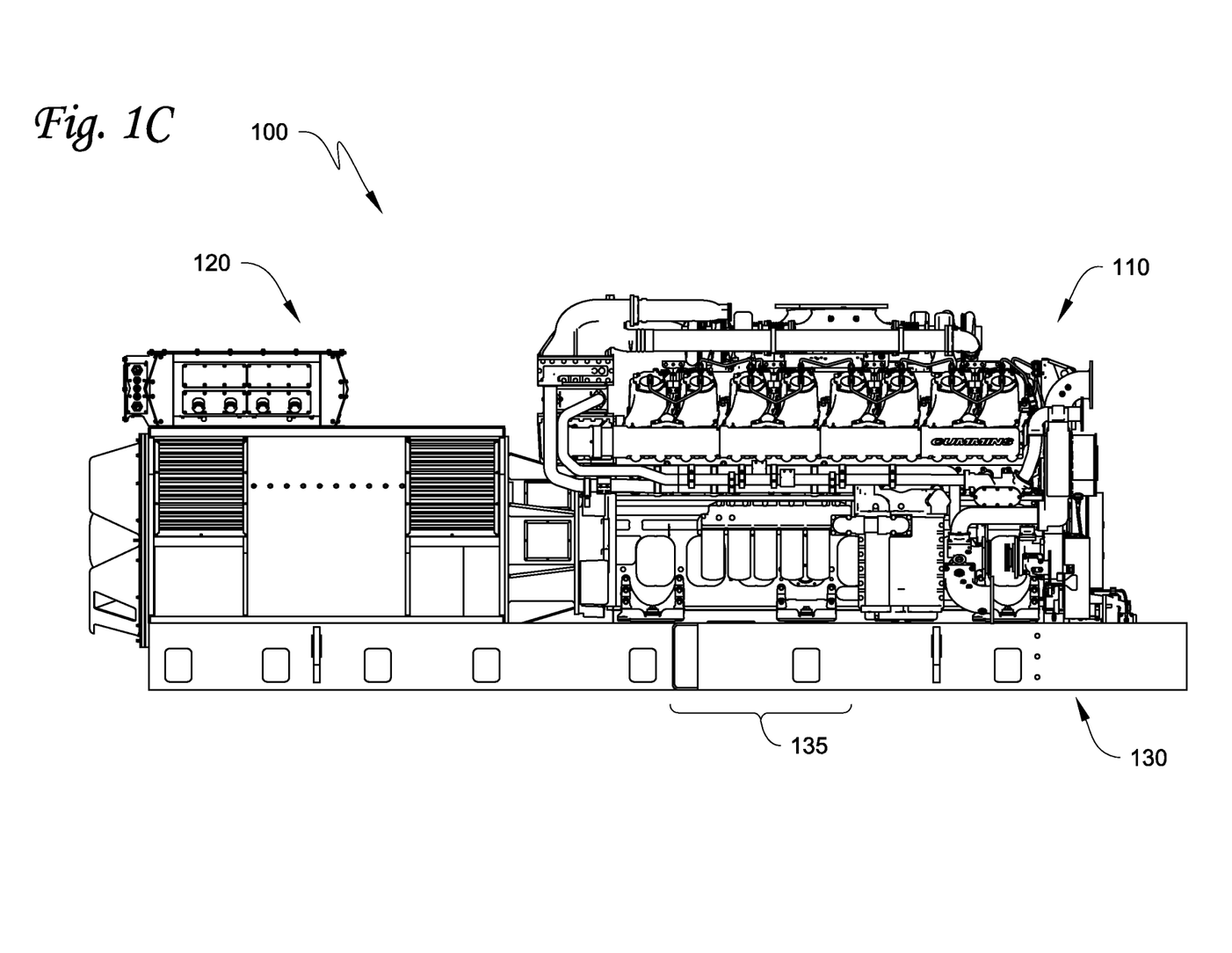
FIG. 1C is a first side view of the power generation system, according to one embodiment.
Figure 1D:
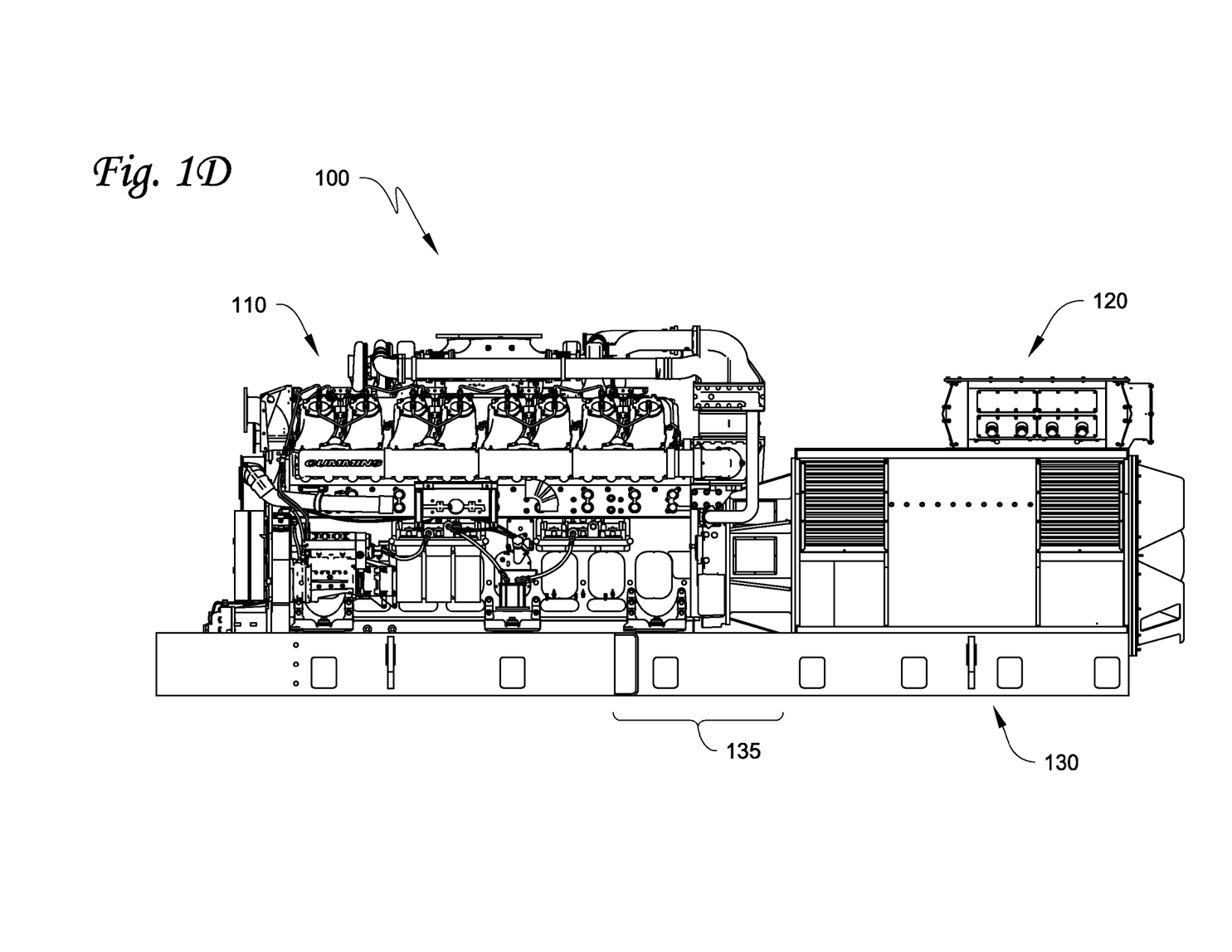
FIG. 1D is a second side view of the power generation system, according to one embodiment.
Figure 1E:
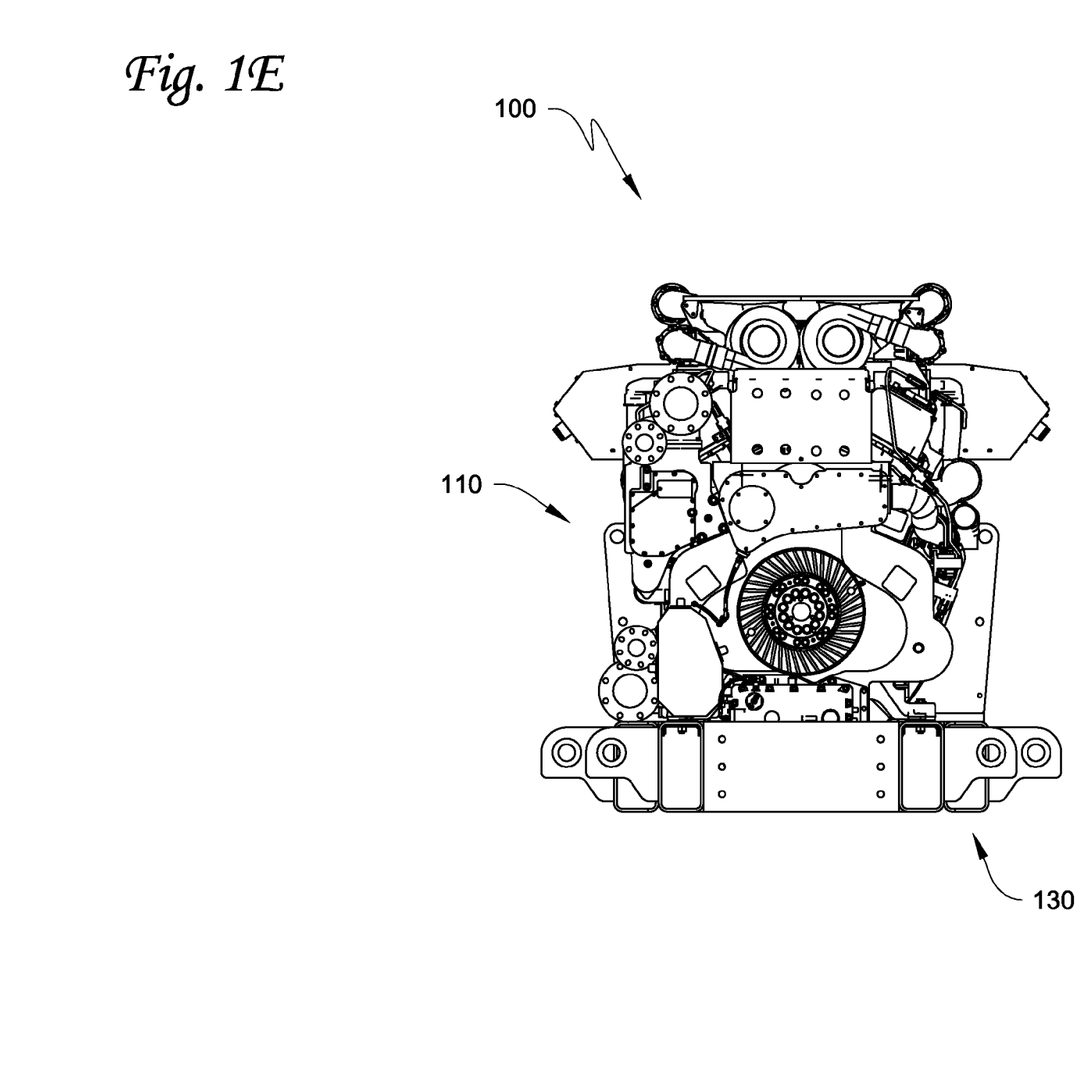
FIG. 1E is an end view of the power generation system, according to one embodiment.
Figure 2A:
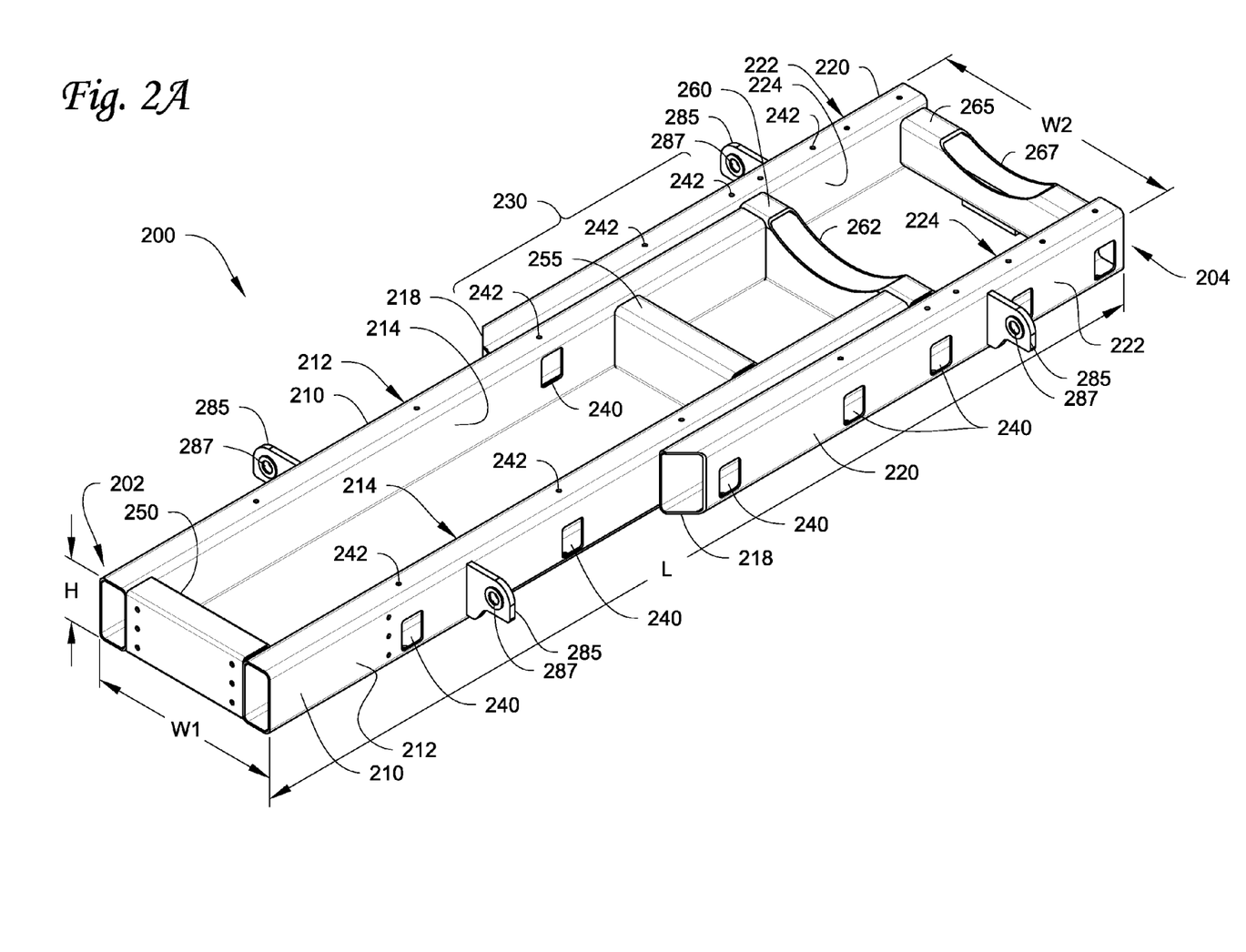
FIG. 2A is a perspective view of a modular skid base for supporting a prime mover and a driven machine, according to one embodiment.
Figure 2B:
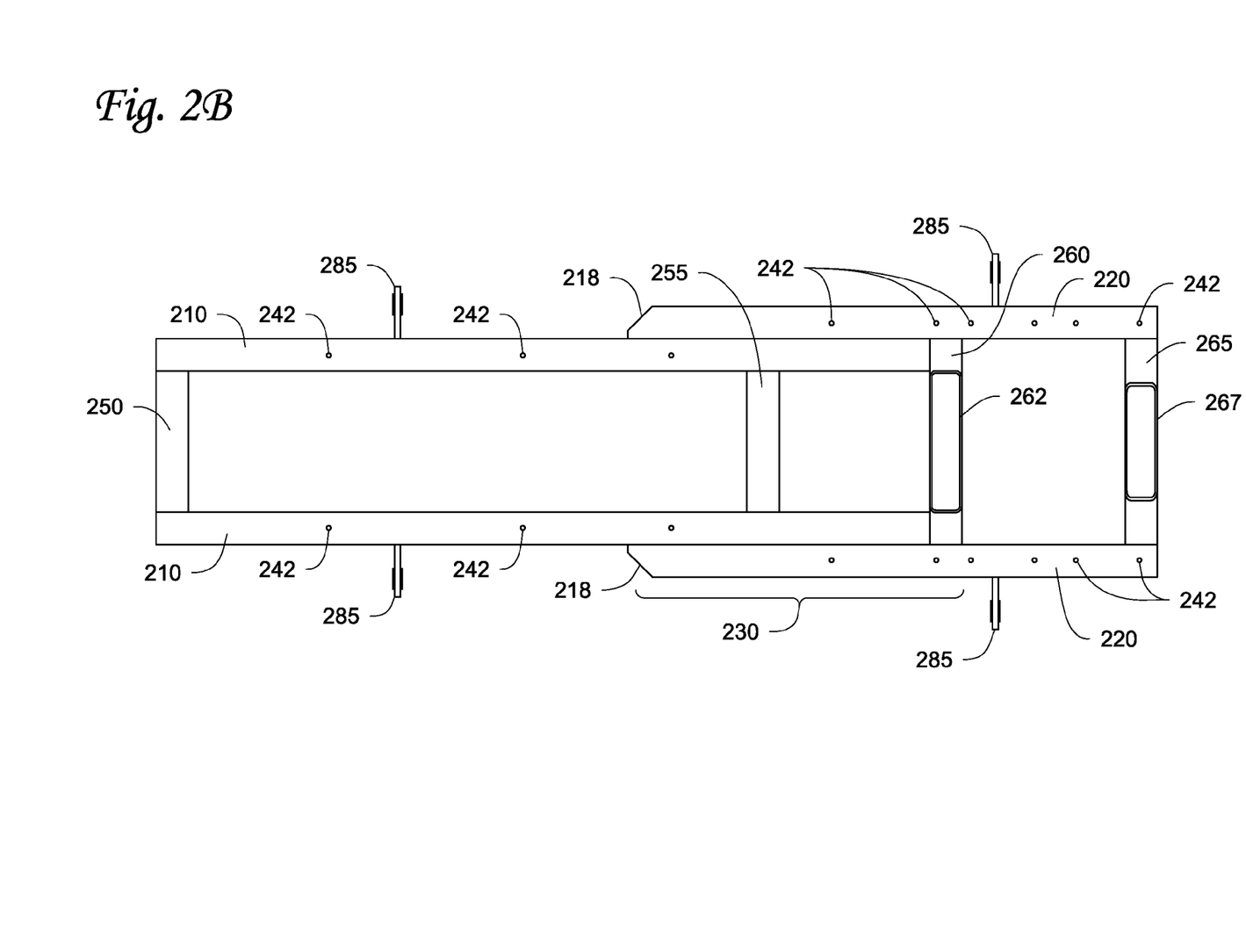
FIG. 2B is a top view of the modular skid base, according to one embodiment.
Figure 2C:
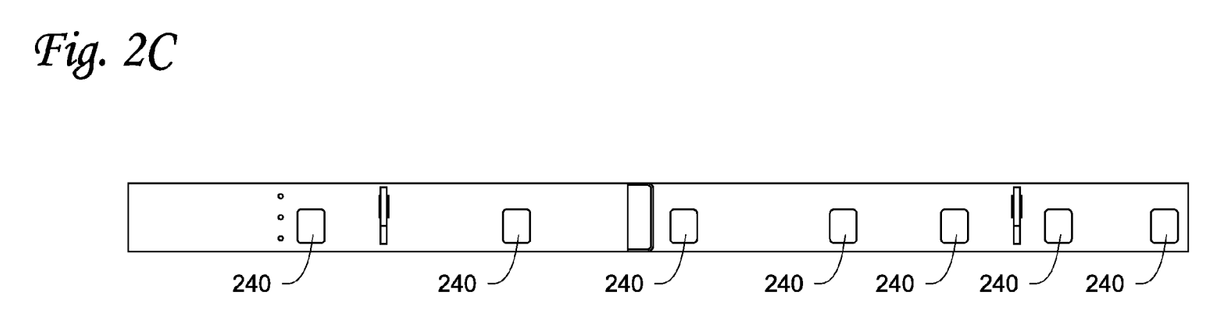
FIG. 2C is a side view of the modular skid base, according to one embodiment.
Figure 2D:
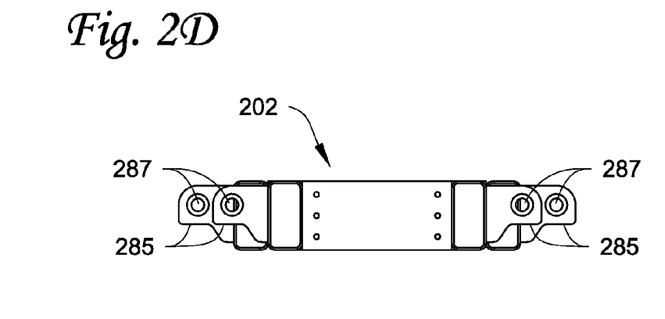
FIG. 2D is a first end view of the modular skid base, according to one embodiment.
Figure 2E:
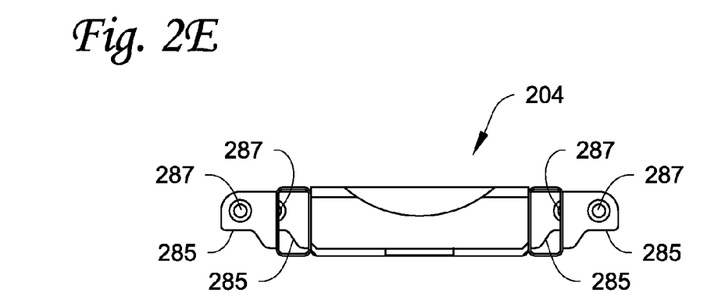
FIG. 2E is a second end view of the modular skid base, according to one embodiment.

As shown in FIGS. 2A and 2C, the pair of first support skid rails 210 and the pair of second support skid rails 220 include a plurality of access holes 240 and 242. The access holes 240 are provided at side surfaces of the first and second support skid rails 210, 220. The access holes 242 are provided at top and bottom surfaces of the first and second support skid rails 210, 220. In some embodiments, paint is applied on the inside of access holes 240 to protect the modular skid base 200 from corrosion. It is noted that by providing the overlapping section 230 to increase the stiffness of the modular skid base 200, the number of access holes 240, 242 can be increased while still providing at least the same amount of stiffness as a conventional supporting frame required to support an equivalent power generation system.

Also, in some embodiments, the pair of first support skid rails 210 and the pair of second support skid rails 220 can include a plurality of lift eyes 285. Each of the lift eyes 285 includes a lifting hole 287. In some embodiments, a lift eye 285 is connected to the outer surfaces 212, 222 of each of the first support skid rails 210 and the second support skid rails 220. The lift eyes 285 extend in a direction approximately perpendicular to the length direction of the pair of first support skid rails 210 and the pair of second support skid rails 220, respectively. The lift eyes 285 can be used for lifting, jacking and/or sliding the modular skid base 200 so that it can be placed, for example, in a freight container (e.g., an ISO container) for intra-plane, transport and/or shipping, and lifting into a customer facility. In some embodiments, each of the lift eyes 285 can be welded to its respective first support skid rails 210 or second support skid rails 220. In other embodiments, each of the lift eyes 285 can be fixed to its respective first support skid rails 210 or second support skid rails 220 using other methodologies including, for example, bolting the lift eyes 285 to the respective first support skid rails 210 or the second support skid rails 220.

Furthermore, the second support skid rails 220, in some embodiments, can include diagonally cut ends 218. The diagonally cut ends 218 can provide a safety feature that can reduce or prevent a user from contacting a hard edge of the second support skid rails 220.

The diagonally cut ends 218 can also spread out the stiffness change going from double support arms (e.g., where the first support skid rails 210 and the second support skid rails 220 overlap) to the single support arm (e.g., a non-overlapping portion of either the first support skid rails 210 or the second support skid rails 220), thereby reducing the stress concentration impact of the stiffness change.

In some embodiments, the pair of first support skid rails 210, the pair of second support skid rails 220, and the first through fourth cross members 250, 255, 260 and 265 are rectangular shaped tube beam sections. However, in other embodiments, other types of beams, supports, skid rails or brackets can be used as the first support skid rails 210, the second support skid rails 220, and the first through fourth cross members 250, 255, 260 and 265.

Also, in some embodiments, by using first support skid rails 210 that overlap with second support skid rails 220, the modular skid base 200 can be manufactured from shorter, lower cost beam sections that share a common length (e.g., 20 ft long beam sections) as opposed to longer, higher cost beams or custom procured beam sections specified to the manufacturer (e.g., foundry) sections (e.g., 40 ft long beam sections) while retaining the length. Thus, the modular skid base 200 can be manufactured more cheaply than a skid base that uses more expensive beam sections that must extend along the entire length of the modular skid base 200.

In one embodiment, the modular skid base 200 can be used for mounting a prime mover such as, for example, a high horsepower prime mover. In some embodiments, the modular skid base can be used for mounting a high horsepower prime mover such as, for example, a 95 liter diesel engine, and a corresponding driven machine. In this embodiment, the first support skid rails 210, the second support skid rails 220 and the first through fourth cross members 250, 255, 260 and 265 are all formed using 16"×8"×½" rectangular tube beam sections. In this embodiment, the length of each of the first support skid rails 210 can be about 16.1 ft (4900 mm) and the length of each of the second support skid rails 220 can be about 11.2 ft (3400 mm). In this embodiment, the length of the overlapping section 230 can be about 5.6 ft (1700 mm). Accordingly, the entire length L of the modular skid base 200 can be about 21.7 ft (6600 mm). The width W1 of the modular skid base 200 at the first end 202 where a prime mover can be mounted is about 4.2 ft (1294 mm). The width W2 of the modular skid base 200 at the second end 204 where a driven machine can be mounted is about 5.6 ft (1700 mm). In this embodiment, the natural resonant frequency of the modular skid base 200 has been found to be about 39 Hz.

The disclosure may be embodied in other forms without departing from the spirit or characteristics thereof. The embodiments disclosed in this disclosure are to be considered in all respects as illustrative and not limitative. The scope of the disclosure is indicated by the appended claims rather than by the foregoing description; and all changes which come within the meaning and range of equivalency of the claims are intended to be embraced therein.

The invention claimed is:

1. A power generation system and skid base combination comprising:
   a prime mover;
   a generator; and
   a skid base supporting the prime mover and the generator, the skid base including:
      a pair of first support members, each of the first support members having an inner surface along a length of the respective first support members and an outer surface along the length of the respective first support members,
      a pair of second support members coupled to the first support members, each of the second support members having an inner surface along a length of the respective second support members and an outer surface along the length of the respective second support members,
      wherein a portion of the inner surface of each of the second support members overlaps a portion of the outer surface of each of the first support members to form an overlapping section that extends along a length direction of the of the first and second support members, the overlapping section having a length that defines a resonant frequency of the skid base with the prime mover and the driven machine that is outside of an operating frequency of the prime mover.

2. The power generation system and skid base combination of claim 1, wherein the length of the overlapping section is at least two times the height of the skid base.

3. The power generation system and skid base combination of claim 1, wherein the prime mover includes an engine flywheel housing and the generator includes a generator adapter connected to the engine flywheel housing, and
   wherein the overlapping section is positioned underneath an area where the generator adapter is connected to the engine flywheel housing.

4. The power generation system and skid base combination of claim 1, wherein the overlapping section is positioned underneath an area where the prime mover and the generator are connected.

5. The power generation system and skid base combination of claim 1, further comprising one or more cross members connecting the inner surface of one of the first support members to the inner surface of the other first support member.

6. The power generation system and skid base combination of claim 5, wherein a first cross member connects the first support members at a first end of the skid base.

7. The power generation system and skid base combination of claim 6, wherein a second cross member connects the inner surface of one of the second support members to the inner surface of the other second support member at a second end of the skid base opposite the first end.

8. The power generation system and skid base combination of claim 7, wherein a third cross member connects the first support members within the overlapping section.

9. The power generation system and skid base combination of claim 8, wherein the third cross member is positioned to allow a user access to an oil pan of the prime mover.

10. The power generation system and skid base combination of claim 9, wherein the generator is mounted to the first cross member and to the third cross member.

11. The power generation system and skid base combination of claim 8, wherein a fourth cross member connects the first support members at an end of the first support members within the overlapping section.

12. The power generation system and skid base combination of claim 11, wherein the second cross member defines a cutout portion at a top surface of the second cross member to receive the driven machine, and the fourth cross member defines a cutout portion at a top surface of the fourth cross member to receive the driven machine, and wherein the driven machine is mounted to the second cross member and to the fourth cross member.

13. The power generation system and skid base combination of claim 1, wherein the skid base includes a generator section for supporting the generator, the generator section provided at a first end of the overlapping section and formed by a remaining portion of the second support members, and a prime mover section for supporting the prime mover, the prime mover section provided at a second end of the overlapping section and formed by a remaining portion of the first support members.

14. The power generation system and skid base combination of claim 1, wherein each of the second support members includes a first end having an edge that is in contact with the outer surface of one of the first support members, and
wherein the first end of one or both of the second support members includes a diagonally cut face configured to reduce a stress concentration of the skid base near the first end of the second support member, the diagonally cut face formed such that the inner surface of the second support member is longer than the outer surface of the second support member.

15. The power generation system and skid base combination of claim 1, wherein the length of the overlapping section is at least ⅓ the length of the first support members.

16. The power generation system and skid base combination of claim 1, wherein the length of the overlapping section is at least ⅓ the length of the second support members.

17. The power generation system and skid base combination of claim 1, wherein the overlapping section extends underneath the driven machine by at least ⅓ a length of the driven machine, and extends underneath the generator by at least ⅓ a length of the generator.

* * * * *